Patented Feb. 8, 1938

2,107,907

UNITED STATES PATENT OFFICE 2,107,907

RECOVERY AND CONVERSION OF THE SULPHUR CONTENT OF INDUSTRIAL GASES

Ludwig Rosenstein, San Francisco, Calif., assignor to Shell Development Company, San Francisco, Calif., a corporation of Delaware No Drawing. Application July 21, 1934,
Serial No. 736,371

8 Claims. (Cl. 23—225)

This invention relates to a process for the recovery and utilization of acidic gaseous components encountered in the treatment of industrial gases. The invention comprises the steps of treating gases or gaseous mixtures containing acidic gaseous components with an inorganic absorbent agent, recovering the acidic gaseous components from and regenerating the absorbent agent, and converting the recovered acidic gases to valuable commercial products.

The acidic gases with which I am concerned are those gases which in water have an acid reaction but which may be recovered unchanged upon sufficient heating of the solution. Hydrogen sulphide, sulphur dioxide, carbon dioxide, carbon monoxide, hydrogen cyanide and nitric oxide are the gases of this type frequently encountered in industrial operations. This invention principally relates to the recovery and conversion of the sulphur-containing acidic gases, particularly hydrogen sulphide. The recovered hydrogen sulphide may be burned to sulphur dioxide or to elemental sulphur. I may react the recovered hydrogen sulphide with air at a temperature sufficiently high to produce molten sulphur without the liberation of undesirable sulphur compounds in the discharged gases.

I may advantageously recover and utilize the hydrogen sulphide content of industrial gases containing it such as petroleum gas, either natural or refinery gas, coke oven gas, generator gas and other manufactured gas as well as the gases generated in various industries such as ore smelting.

For the absorption of the hydrogen sulphide, I prefer to employ an inorganic salt solution as the absorbent agent. A suitable inorganic absorbent agent is one which permits substantial recovery of hydrogen sulphide by reversal of the absorption reaction as by boiling. The absorbent agent must be capable of regeneration to a predetermined extent by liberation of hydrogen sulphide therefrom.

Organic bases or basic-reacting compounds or solutions thereof are not suitable absorbent agents in accordance with my invention. When hydrogen sulphide is recovered from gases or gaseous mixtures containing hydrocarbons as well, the use of organic bases is objectionable. Hydrocarbons are appreciably soluble in such solutions and are released along with the hydrogen sulphide when the absorbent agent is regenerated. If it is desired to burn the hydrogen sulphide to sulphur dioxide for use in the production of sulphuric acid, the presence of hydrocarbons is undesirable. Combustion of the recovered gaseous mixture may lead to undesirable combustion products such as carbon monoxide.

The inorganic salt solutions are particularly suitable absorbents for use in my invention. Their use provides a simple, flexible and economical method for the separation and recovery of hydrogen sulphide from gases as well as for the purification of other gases by the removal of hydrogen sulphide therefrom. I prefer to employ those inorganic salt solutions which are capable of absorbing hydrogen sulphide rapidly and are capable of being regenerated to a predetermined extent by reversal of the absorption reaction whereby substantially pure hydrogen sulphide is evolved. Any suitable inorganic salt solution possessing the above-described properties may be employed. Aqueous solutions of the alkali metal phosphates were found to be particularly suitable absorbents; aqueous $K_3PO_4$ solutions being in many respects the most suitable. Cold aqueous solutions of $K_3PO_4$, particularly concentrated, absorb hydrogen sulphide rapidly and evolve substantially pure hydrogen sulphide on reversal of the absorption reaction as by boiling the solution at subatmospheric, atmospheric or superatmospheric pressures. The reversal of the absorption reaction and consequently the regeneration of the absorbent solution may be carried as far as desirable by continued boiling of the solution. When such boiling is practiced at an elevated temperature, the regenerated solution may be cooled before it is returned to an absorption stage. In case the regeneration is effected by boiling at low pressures and correspondingly low temperatures, the solution need not be cooled prior to its reuse in an absorption stage. The regenerated solution may be used in batch, intermittent or continuous processes.

I prefer to execute my invention in a continuous manner employing a cyclic absorption-regeneration system in communication with a conversion stage wherein the liberated hydrogen sulphide is oxidized to sulphur. In the cyclic absorption-regeneration system, the gas or gaseous mixture containing hydrogen sulphide is countercurrently brought into contact with the absorption solution, a minor part of the used solution is boiled and regenerated to a predetermined extent, and the major portion of the solution is regenerated to a lesser extent than that accorded the minor portion. The thus regenerated portions are then conducted to an absorption stage or stages wherein the major portion and minor portion are successively, countercurrently contacted with the gaseous material treated, the lesser regenerated portion being contacted first. In addition to this efficient and desirable mode of operation, I may operate in such a manner that the energy involved in regenerating the minor bulk of absorbent solution to its predetermined minimum is utilized in a subsequent stage or stages for the lesser regeneration of the main bulk of absorbent material thus materially effecting thermal economies Aqueous, preferably concentrated, $K_3PO_4$ solutions are particularly adaptable to use in this mode of execution of my invention.

For purposes of illustration, the following specific example setting out the mode of procedure and preferments embodied in my invention for the substantial purification of natural gas and conversion of the recovered hydrogen sulphide to elemental sulphur, is introduced.

Example I

It is desired to recover hydrogen sulphide from natural gas containing about 2.5% $H_2S$ and purify the treated gas to the extent that, after treatment it contains only about 0.0032% $H_2S$. It is further desired to convert the recovered $H_2S$ to sulphur.

The solvent employed for the absorption of $H_2S$ is an aqueous $K_3PO_4$ solution which at 25° C. has a concentration of about 2.5 mols of $K_3PO_4$ per 1000 gms. of solution. The gas to be treated is countercurrently contacted with the $K_3PO_4$ solution in a suitable absorption stage. On leaving the absorption stage, the solution has absorbed $H_2S$ to the extent that its total sulphur content is about 1.8 mols per 1000 gms. of solution. It was calculated that the desired extent of purification could be accorded the treated gas in the most economical manner by bringing the gas into contact in the countercurrent scrubbing tower first with about 92% of the solvent regenerated to the extent that its total sulphur content has been reduced to about 1.22 mols of sulphur per 1000 gms. of solution, and then with the remaining 8% of the used solution which has been regenerated to the extent that its sulphur content is reduced to about 0.5 mol. of sulphur per 1000 gms. of solution. The highly regenerated portion is fed into the upper portion of the absorber while the main body of lesser regenerated solution is added at a zone several plates below.

On leaving the scrubbing tower, the solvent containing about 1.8 mols of sulphur per 1000 gms. of solution is passed into a regenerating unit. The regenerating unit consists of a primary regenerating column containing about 12 contact plates and a secondary regenerating column containing about 4 contact plates and separated from the primary column by a dividing plate or plates. The regeneration is effected by boiling the solution, heat being supplied by means of steam coils, to the lower portion of the secondary column. About 8% of the solution is regenerated to a sulphur content of about 0.55 mol. per 1000 gms. and the remaining 92% is regenerated in the primary regenerating column to a sulphur content of about 1.22 mols per 1000 gms. of solution. The steam generated in effecting regeneration in the secondary column passes, by means of the dividing plate, into the primary column wherein it effects regeneration to a lesser extent of the main bulk of solution. The $H_2S$ evolved in the regeneration unit leaves the top of the primary column in admixture with steam. On cooling, the steam is condensed and the substantially pure hydrogen sulphide is discharged from the cyclic absorption-regeneration system. The condensed steam is returned to the regeneration unit as reflux, thus maintaining the effective concentration of the solvent substantially constant throughout the operation.

The substantially pure $H_2S$ evolved on regeneration of the absorbent solution may be partially oxidized to elemental sulphur or substantially completely oxidized to sulphur dioxide by effecting its combustion with a predetermined quantity of oxygen preferably less than ½ mol. oxygen per mol. of $H_2S$. The oxidizing agent employed may be oxygen per se or a suitable oxygen-containing gas such as air. In the majority of cases, for reasons of convenience and economy the $H_2S$ is burned with a predetermined amount of air. If desired, the combustion may be effected in the presence of a suitable catalytic agent. I prefer to effect the incomplete combustion of $H_2S$ to sulphur by mixing the $H_2S$ with a quantity of air insufficient to effect complete combustion and conducting the $H_2S$-air mixture to a suitable combustion chamber. Due to the insufficiency of oxygen in such a mixture, the combustion product is elemental sulphur which may be conducted from the combustion chamber in a molten state. The molten sulphur may be run into molds and solidified. The solidified sulphur may be obtained in any desired form by treatment in granulators and the like. If $SO_2$ is desired for commercial purposes such as the manufacture of sulphuric acid, sulphates, etc., it may be obtained directly by the combustion of $H_2S$ with a sufficient quantity of air, or the sulphur prepared by the incomplete combustion may be charged to a sulphur burner and burned to $SO_2$. The sulphur per se or $SO_2$ may be used for a wide variety of purposes for which $H_2S$ is unsuitable. The residual gases of the partial or complete combustion are conducted into a suitable cooler wherein steam is condensed and the condensate discharged from the system. Any sulphur vapor carried over with the discharged gases is precipitated in the cooler as finely divided solid sulphur, which sulphur may be intermittently or continuously discharged from the system. The cooled gases, mainly $H_2S$ and nitrogen, are scrubbed in a countercurrent absorption-regeneration system whereby $H_2S$ is recovered for further utilization and the residual gas, mainly nitrogen, is discharged from the system free of obnoxious sulphur compounds.

The gas which is purified to the desired extent in the $H_2S$ absorption stage or stages may be discharged from the absorption system and utilized as desired. When hydrocarbon gases such as natural gas are treated, the purified gas may be utilized as fuel to supply the steam used to regenerate the inorganic absorbent solution.

The process may be conducted at various temperatures and pressures. In the absorption stage or stages, the contact between gas or vapor and the liquid absorbent solution may be obtained by a countercurrent scrubbing action, by bubbling the aeriform fluid through the solution or by any suitable method known to the art. For example, the apparatus described in a co-pending application (Kramer-Rosenstein) Serial No. 725,474, may be utilized in effecting the intimate contact of a gaseous mixture with a liquid absorbent agent and regenerating the absorbent agent with material savings in energy expended in the regeneration. Water which is vaporized with the hydrogen sulphide may be separated therefrom by a condenser stage in communication with the regenerator stage or stages as disclosed in the above-mentioned application, thus maintaining the initial concentration of the absorbent agent substantially constant. If desired, water may be introduced from an outside source at suitable intervals or continuously to maintain the predetermined concentration of the absorbent agent if the condensate is not returned to the system. Since the hydrogen sulphide leaving the regenerator stage or stages is saturated with water, the water thus removed can be compensated for by the introduction of water from an outside source.

The advantages inherent in the use of aqueous $K_3PO_4$ solutions as absorbent agents for hydrogen sulphide are more fully discussed in U. S. Patent No. 1,945,163 granted to Ludwig Rosenstein as co-inventor.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the advantageous results attained. On the other hand, the invention is to be regarded as limited only by the terms of the appended claims, in which it is my intention to claim all novelty inherent therein as broadly as is possible in view of the prior art.

I claim as my invention:

1. A process of utilizing the hydrogen sulphide in gases which comprises contacting said gases containing hydrogen sulphide with an aqueous solution containing $K_3PO_4$, evolving substantially all of the hydrogen sulphide from said solution in a substantially pure state, burning the separated hydrogen sulphide with a limited amount of air to form molten sulphur, separating the molten sulphur from water formed in the reaction and residual gases, separating the sulphur compounds in the residual gases by passing the same through an aqueous solution containing $K_3PO_4$, and withdrawing the remaining gases composed largely of nitrogen.

2. A cyclic process of utilizing the hydrogen sulphide in gases which comprises countercurrently contacting said gases containing hydrogen sulphide with an aqueous solution containing $K_3PO_4$ in an absorption stage, conducting the used solution to a regenerator stage wherein a minor portion of the solution is boiled and thereby regenerated to a predetermined extent and the steam generated therefrom utilized to effect regeneration to a lesser extent of the main bulk of solution, independently, countercurrently contacting each portion of regenerated solution with the gas containing hydrogen sulphide, the more regenerated portion being contacted last with the material treated, and conducting the substantially pure hydrogen sulphide evolved in the regenerator stage to a conversion stage wherein it is subjected to combustion with an oxygen-containing gas.

3. A cyclic process of utilizing the hydrogen sulphide in gases according to claim 2, in which the non-gaseous end products of the combustion are discharged from the system and the residual gases of the combustion are countercurrently contacted with an aqueous solution containing $K_3PO_4$ and substantially freed of hydrogen sulphide whereby the gas thus treated is adapted to be freely vented into the air.

4. A cyclic process of utilizing the hydrogen sulphide in gases according to claim 2, in which the evolved hydrogen sulphide is subjected to an incomplete combustion to produce elementary sulphur and in which the gases discharged from the conversion stage are countercurrently contacted with an aqueous $K_3PO_4$ solution and substantially freed of hydrogen sulphide.

5. A cyclic process for the preparation of sulphur which comprises countercurrently contacting a fluid containing hydrogen sulphide with a plurality of portions of a solution of a basic-acting inorganic compound, separating the treated material from the absorbent solution, heating the main body of absorbent solution to evolve hydrogen sulphide therefrom and effect its regeneration to a predetermined extent, heating a minor portion of the absorbent solution to evolve hydrogen sulphide therefrom and effect its regeneration to a greater extent than that accorded the major bulk of fouled absorbent solution, subjecting the evolved hydrogen sulphide to combustion with an oxygen-containing gas, and independently, countercurrently contacting the regenerated portions of absorbent solution with the fluid material containing hydrogen sulphide, the least regenerated portion being first contacted.

6. A cyclic process for the production of sulphur which comprises countercurrently contacting a fluid containing hydrogen sulphide with a plurality of portions of a solution of a basic inorganic salt in an absorption stage, separating the treated material from the fouled absorbent solution, conducting the fouled solution to a regenerator stage wherein a minor portion of the solution is boiled and thereby regenerated to a predetermined extent and the steam generated therefrom utilized to effect regeneration to a lesser extent of the main bulk of fouled solution, conducting the hydrogen sulphide evolved in the regenerator stage to a combustion stage wherein it is subjected to combustion with an oxygen-containing gas, and independently countercurrently contacting the portions of absorbent solution regenerated to different extents with the fluid material to be treated in an absorption stage, the least regenerated portion being first contacted.

7. A cyclic process of recovering and utilizing the hydrogen sulphide content of gases which comprises countercurrently contacting a gaseous mixture containing hydrogen sulphide in a single absorption stage with a plurality of portions of an aqueous $K_3PO_4$ solution regenerated to different extents, separating the treated gaseous material from the fouled absorbent solution, dividing the fouled absorbent solution into a major portion and a minor portion, conducting the major portion to an activation stage wherein it is heated and regenerated to a predetermined extent, conducting the minor portion to a separate activation stage wherein it is heated and regenerated to a predetermined extent greater than that accorded the major portion, and independently, countercurrently contacting the separately regenerated portions with the gaseous material treated in a single absorption stage in the order of the increasing extent to which each has been regenerated, conducting the hydrogen sulphide liberated in the regeneration stages to a conversion stage and therein oxidizing the hydrogen sulphide to sulphur.

8. A cyclic process for the production of sulphur which comprises countercurrently contacting a gaseous mixture containing hydrogen sulphide in a single absorption stage with a plurality of portions of an aqueous $K_3PO_4$ solution regenerated to different extents, separating the treated gaseous material from the fouled absorbent solution, dividing the fouled absorbent solution into a major portion and a minor portion, conducting the portions to separate activation stages, boiling the minor portion in one activation stage to effect its substantially complete regeneration and conducting the evolved hydrogen sulphide and steam into a communicating activation stage wherein the steam effects boiling and regeneration of the major portion of fouled solution to a predetermined lesser extent than is accorded the minor portion, conducting the hydrogen sulphide evolved in both activation stages to a conversion stage wherein it is mixed with air and oxidized to sulphur, and independently, countercurrently contacting the separately regenerated portions of absorbent solution with the material to be treated in a single absorption stage, the least regenerated portion being first contacted.

LUDWIG ROSENSTEIN.